United States Patent [19]

Pritchard

[11] 4,350,943

[45] Sep. 21, 1982

[54] AMPLIFIER FOR INDUCTIVE LOADS WITH CORRECTIVE CURRENT SENSING

[76] Inventor: Eric K. Pritchard, 1702 Plymouth Ct., Bowie, Md. 20716

[21] Appl. No.: 137,301

[22] Filed: Apr. 4, 1980

[51] Int. Cl.³ ............................................. G05B 19/40
[52] U.S. Cl. .................................... 318/696; 318/432; 323/284; 323/287; 323/285
[58] Field of Search ............... 318/696, 432, 685, 681; 323/206, 249, 284, 285, 286, 287, 290, 302, 310, 329

[56] References Cited

U.S. PATENT DOCUMENTS 4,074,175  2/1978  Born et al. .......................... 318/432

Primary Examiner—J. V. Truhe
Assistant Examiner—Eugene S. Indyk

[57] ABSTRACT

This switching amplifier is for driving inductive loads, stepping motors in particular. This amplifier uses dual threshold concept with improvements to the current feedback. These improvements compensate for errors in the feedback signals of the prior art. These improvements measure currents erroneously omitted or included in the feedback signal and add or subtract said measurements from said feedback to improve signal fidelity.

26 Claims, 2 Drawing Figures

IMPROVEMENT

AMPLIFIER FOR INDUCTIVE LOADS WITH CORRECTIVE CURRENT SENSING

BACKGROUND OF THE INVENTION

This invention is an improvement to the switching amplifier disclosed in my U.S. Pat. Nos. 4,087,732 and 4,140,956. This switching amplifier is used to drive stepping motors and is related generally to switching amplifiers for inductive loads.

Stepping motors are specialized synchronous motors designed to be driven over a wide range of speeds including being stopped. The low-frequency energization of stepping motors must limit the motor current to keep the motor from incinerating. The prior art contains many approaches to limiting the motor current. Of these, switching amplifiers provide the greatest performance with the best efficiency. The switching amplifier disclosed herein is a single supply voltage variety and not the dual voltage type which uses the higher voltage to create the rapid current rise needed for high speed operation and a lower voltage to maintain the motor current without overheating. More specifically, the amplifier disclosed herein attempts to control the motor current between two thresholds, whose values are the amplifier input offset by an internally generated hysteresis signal. It is important to compare these thresholds against accurate representations of the motor current so that the amplifier is more nearly linear.

OBJECTS OF THE INVENTION

The first object of this invention is to improve the fidelity of the feedback signal which represents the motor current.

The second object of this invention is to filter out of the feedback signals unwanted switching noise.

DESCRIPTION OF THE PRIOR ART

The prior art switching amplifier circuit excluding diodes 2 through 6 was disclosed in my U.S. Pat. No. 4,140,956 and included herein by reference. This circuit exhibited inductive spikes from the windings 8 when the transistors 10 and 12 were turned off. These spikes could burn out transistors 10 and 12. Diodes 2 and 4 and zener 6 were added in the standard fashion to protect the output transistors 10 and 12 from the leakage inductances of the motor windings.

Figure 1:
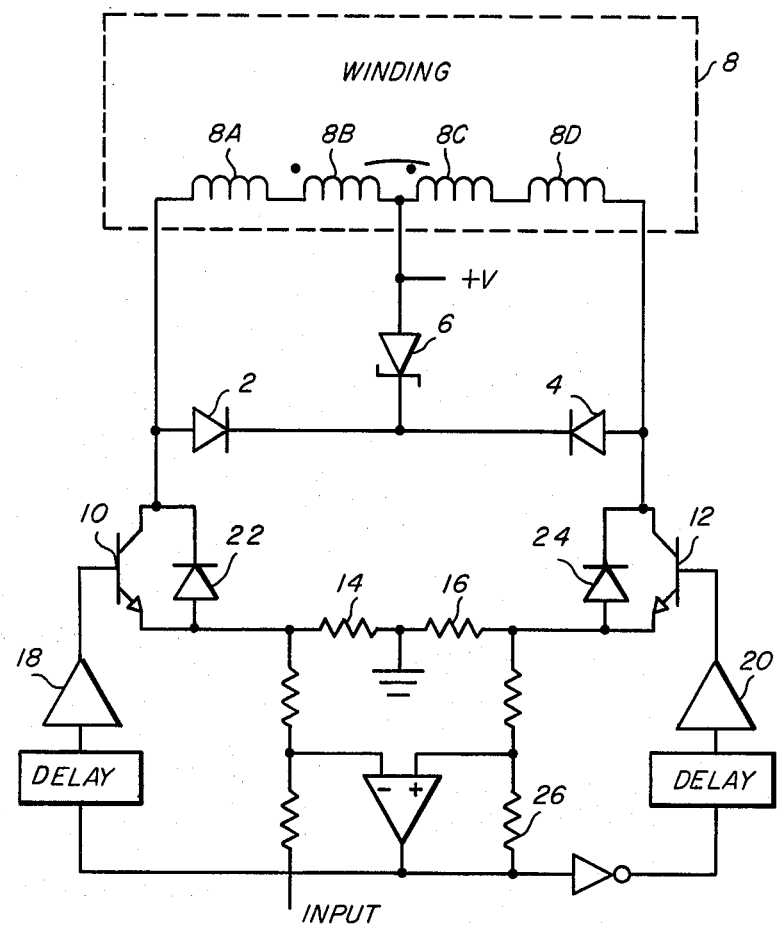
FIG. 1 is a schematic of the prior art.

The inductive windings 8 are shown as two ideally coupled windings 8B and 8C with leakage inductances 8A and 8D. If these leakage inductances were not present, the inductive spike would be entirely clamped by diodes 22 and 24 and the inductive coupling. Unfortunately, inductances 8A and 8D do exist in the motor and its associated wiring and create a flyback voltage which must be clamped by diodes 2 or 4 to protect the switching transistors 10 and 12 from excessive voltages. During the short time that these diodes are conducting, the motor currents are not accurately represented by the voltages on sensing resistors 14 and 16. Although the amplifier of FIG. 1 can ignore these error signals when the hysteresis signal of resistor 26 is large, having large hysteresis signals forces a low switching frequency which can create unwanted motor motions and which is irritatingly audible.

The currents in sense resistors 14 and 16 are supposed to be representative of the total motor current. Said currents cannot be representative of the motor currents if some of the motor current is diverted through diodes 2 and 4. Also, said currents cannot be representative of the motor currents if said sense resistor currents include significant base drive currents from amplifiers 18 and 20.

DESCRIPTION OF THE PREFERRED EMBODIMENT

Figure 2:
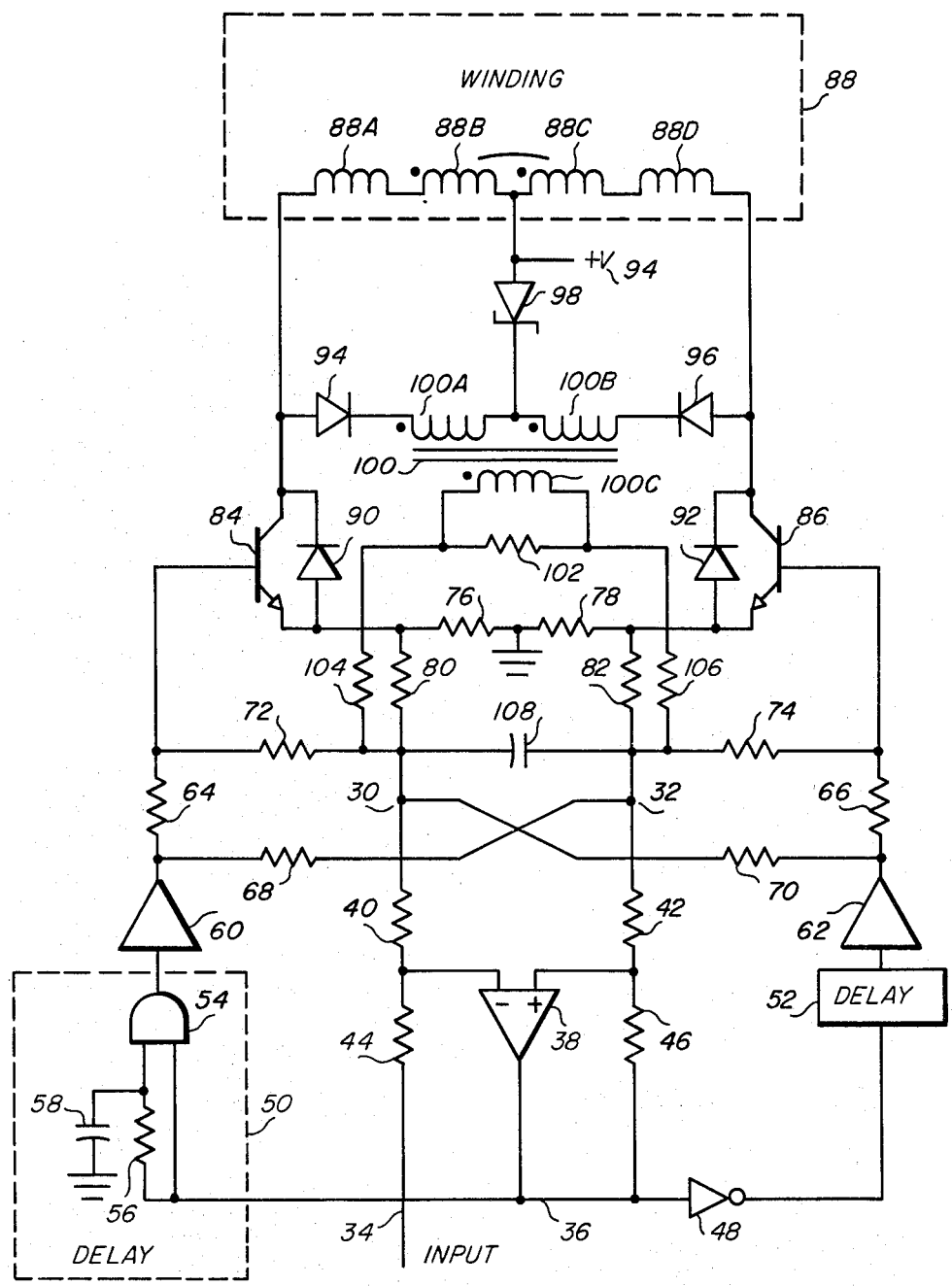
FIG. 2 is the schematic of this invention.

The improvements disclosed in FIG. 2 compensate the error currents in the sensed current for clamping diodes and base drive circuits. The FIG. 2 schematic also includes a filter capacitor to filter feedback noise and resistor network designed to facilitate amplifier gain changing.

The circuit of FIG. 2 operates in a feedback manner as follows: the sense voltages at nodes 30 and 32 are compared differentially against the input 34 and the hysteresis signal 36 by comparator 38 and resistors 40, 42, 44, and 46 to create output/positive feedback 36. This output drives delay 50 directly and delay 52 via inverting amplifier 48. These delay circuits delay the rising edge of the input and do not delay the falling edge. This delay may be implemented with an AND gate 54 and RC delay 56 and 58. The delay circuits control transistor driving amplifiers 60 and 62. The base drive currents are sensed by resistors 64 and 66. The voltages across resistors 64 and 66 are connected to nodes 30 and 32 via resistors 68, 70, 72, and 74 so as to cancel the effects of the base drive currents as sensed by resistors 76 and 78 which are connected to nodes 30 and 32 by resistors 80 and 82. Resistors 64 through 82 should have proportional or equal values as listed below to properly cancel the base drive signal. The base drive currents in resistors 64 and 66 operate transistors 84 and 86. These transistors control the currents in windings 88. The winding currents in transistors 84 and 86 pass through resistors 76 and 78 to provide nodes 30 and 32 an indication of the motor current. The primary inductive flyback, as created by windings 88B and 88C are conducted by diodes 90 and 92 back into the power supply connection 94. Resistors 76 and 78 also sense the flyback currents in diodes 90 and 92 in an attempt to measure the net current within winding 88. The secondary inductive flyback of windings 88A and 88D are clamped by diodes 94 and 96 and zener 98. As mentioned herein above the currents in diodes 94 and 96 need to be sensed also so that nodes 30 and 32 differentially indicate the net currents in winding 88. Consequently, differential current transformer 100 is inserted in the current path of diodes 94 and 96. Resistor 102 loads the transformed output winding 100B. Preferably, resistor 102 is the same value as resistors 76 and 78 so that the current transformer may be trifilar wound in the ratio of 1:1:1 for the tightest possible coupling. The voltage across resistor 102 is connected to nodes 30 and 32 by resistors 104 and 106.

The symmetric operation of the switching amplifier may now be explained. Suppose the output of the comparitor is high and the time delay 50 has expired, then transistor 84 is on and 86 is off. Depending upon the direction of the current flow in winding 88, the current in winding 88 is then either flowing in transistor 84, or in diodes 90 and 96. If the current is flowing in transistor 84 then the emitter voltage is positive and becoming greater in magnitude. If the current is flowing in diode 90, the emitter voltage is negative and decreasing in magnitude, i.e. increasing towards zero. According to the prior art, any current flowing in diode 96 should be flowing in diode 90. To compensate, transformer 100 transforms the transient flyback current for sensing circuit while isolating the sensing circuit from the power supply 94. The transformed flyback current then makes the dotted end of winding 100C negative, and compensates the voltage on the emitter of transistor 84. Further compensation of the differential voltage between nodes 30 and 32 for the base current in transistor 84 is accomplished by resistors 64, 68, and 72. In any situation, the voltage on node 30 rises with respect to the voltage on node 32. When the voltage on 30 rises so that the negative input of comparator 36 exceeds the positive input, the output 36 goes low. This immediately turns off transistor 84, drives the positive input of the comparator further below the negative input, and after delay 52 turns on transistor 86. The symmetric operation of this circuit now follows. The base current of transistor 86 is sensed by resistor 66 and compensates the voltage between nodes 30 and 32 via resistors 70 and 74. If transistor 84 was conducting prior to the comparator switching, then diodes 92 and 94 conduct the flyback. Transformer 100 and resistor 102 sense the current in diode 94 and compensate nodes 30 and 32 via resistors 104 and 106. If diodes 90 and 96 were conducting, then transistor 86 conducts. In the former case, the emitter of transistor 86 is negative and decreasing in magnitude. In the latter case, the emitter of transistor 86 is positive and rising. In either case, the voltage at node 32 rises with respect to node 30. When node 32 rises so that the positive input of comparator 38 is greater than the negative input, then the output switches to a high. This immediately turns off transistor 86, drives the positive input of the comparator further above the negative input, and after delay 50 turns on transistor 84. The switching cycle is thus completed.

Capacitor 108 is placed across nodes 30 and 32 to form a filter with resistors 68, 70, 72, 74, 80, 82, 104, and 106 and to reduce the switching spikes which can create spurious oscillations in the amplifier and which can cause excessive transistor dissipations.

Preferably the components of FIG. 2 have the following relationships:
R76=R78=R102
R80=R82=R104=R106
R68=R70=R72=R74
R64=R66
(R76)(R68)=(R64)(R80)
R40=R42
R44=R46

Typical comparator produce too large an output voltage to be used directly. In that case, resistor 46 is replaced by a network such as found in my patent 4,140,956.

The gain of the amplifier is varied by changing resistors 40 and 42.

The resistors 76 and 78 form a first or primary current sensing means as established in the prior art resistors 14 and 16. The diodes 94, 96, and 98 form a current path which diverts motor current from the primary or first current sensors. A second current sensing means consisting of transformer 100 and resistor 102 compensates the primary sensor for the current flowing in diodes 94, 96, and 98 so that the combined signals of the first and second sensors more accurately reflect the net current in the windings 88.

Similarly, the current in resistors 64 or 66 also flows in the primary current sensing means making said primary sensing means less indicative of the current in winding 88. A second current sensing means, resistors 64 or 66, compensate the primary sensor for the currents which control the load switching transistors 84 and 86 so that the combined signals of the first and second sensors more accurately reflect the net current in the windings 88.

The capacitor 108 and resistors 68, 70, 72, 74, 80, 82, 104, and 106 filter the signals from the various sensors to eliminate spurious responses of comparator 38.

Although this invention has been disclosed in detail its scope is the correction of the primary current sensor signal by a secondary current sensor so that the combined signal of the sensors more accurately reflect the load current. The above description is an example of this invention whose scope is limited only by the appended claims.

I claim:
1. A switching amplifier for inductive loads and having an input consisting of:
   a. A switching means and a diode means connected across said switching means for conducting the current in said load;
   b. A first sensing means for sensing the current in said switching means and said diode means;
   c. A current path whose current makes the current in said first sensor differ from the current in said inductive load;
   d. A second sensing means for sensing the current in said current path;
   e. A comparator means responsive to said first sensing means, said second sensing means, and said input for controlling said switching means.
2. The switching amplifier of claim 1 whose current path is the clamping means for protecting said switching means.
3. The switching amplifier of claim 2 whose second sensing means includes a transformer.
4. The switching amplifier of claim 1 whose current path includes the means for controlling the switching means.
5. The amplifier of claim 4 whose second sensor includes a resistor.
6. The amplifier of claim 1 wherein said the output of said sensor means includes a filter means.
7. The amplifier of claim 1 in which the comparator is also responsive to its output.
8. A switching amplifier having an input for driving an inductive load comprising:
   a. Switching means for controlling the currents of said load;
   b. First sensing means to sense the currents through said switching means;
   c. Second sensing means for sensing the currents which control said switching means;
   d. A comparator means responsive to said first and second sensing means and said amplifier input;
   e. Means for driving said switching means in response to the output of said comparator means.
9. A switching amplifier having an input for driving an inductive load comprising:
   a. Switching means for controlling the load currents of said inductive load and diode means for conducting the flyback current of said inductive load;

b. Clamping means to protect said switching means;

c. First current sensing means for producing a signal indicative of the current within said clamping device;

d. Second current sensing means for producing a signal indicative of the current within said switching means and within said diode means;

e. Comparator means for producing a signal indicative of the said first sensor, said second sensor, and said amplifier input;

f. Means for driving said switching means in response to said comparator output.

10. The amplifier of claim 9 whose first current sensing means includes a transformer.

11. The amplifier of claim 9 which includes a filter means for smoothing the response of said first and second sensing means.

12. A switching amplifier for tapped inductive loads and having an input and consisting of:

a. A switching means for controlling the current in said load;

b. A first sensing means for sensing the current in said switching means c. A second sensing means for sensing the flyback in one portion of said tapped inductive load;

d. A third sensing means for sensing the flyback current of another portion of said tapped inductive load;

e. A comparator means responsive to said input, said first sensing means, said second sensing means, said third sensing means, and said input for controlling said switching means.

13. The switching amplifier of claim 12 whose third sensing means includes a transformer.

14. The switching amplifier of claim 12 which includes a delaying means for delaying the conduction of said switching means.

15. The switching amplifier of claim 14 whose third sensor includes a resistor.

16. The switching amplifier of claim 12 wherein said comparator means includes a filter.

17. The switching amplifier of claim 12 in which the comparator is also responsive to its output.

18. A switching amplifier having an input and for driving an inductive load comprising:

a. A switching means for controlling the load currents in said inductive load;

b. First sensing means to sense the flyback currents of said inductive load;

c. Second sensing means to sense the currents through said switching means;

d. Third sensing means for sensing the input drive currents of said switching device;

e. Comparator means responsive to said first sensing means, said second sensing means, said third sensing means, and said amplifier input for driving said switching means.

19. A switching amplifier having an input and for driving currents into an inductive load comprising:

a. Switching means for controlling the currents in said load;

b. First and second clamping means connected to said inductor;

c. First and second current sensing means for producing a signals indicative of the current within said first and second clamping means;

d. Third current sensing means for producing a signal indicative of the current within said switching device;

e. Comparator means responsive to said first sensing means, to said second sensing means, to said third sensing means, and to said amplifier input;

f. Means for driving said switching devices in response to said comparator.

20. The amplifier of claim 19 whose first current sensing means includes a transformer.

21. The amplifier of claim 19 wherein said comparator means includes a filter means.

22. The switching amplifier of claim 12 including a forth sensing means for sensing the input currents to said switching devices and wherein said comparator is also responsive to said forth sensing means.

23. The switching amplifier of claim 18 which includes a delaying means responsive to said comparator means for delaying the conduction of said switching means.

24. The switching amplifier of claim 18 wherein said comparator includes a filter.

25. The switching amplifier of claim 19 which also includes a delay means responsive to said comparator means for delaying the conduction of said switching means.

26. The switching amplifier of claim 19 which includes a forth sensing means for sensing the drive currents of said switching means and wherein said comparator means is responsive to said forth sensing means.

* * * * *